UNITED STATES PATENT OFFICE.

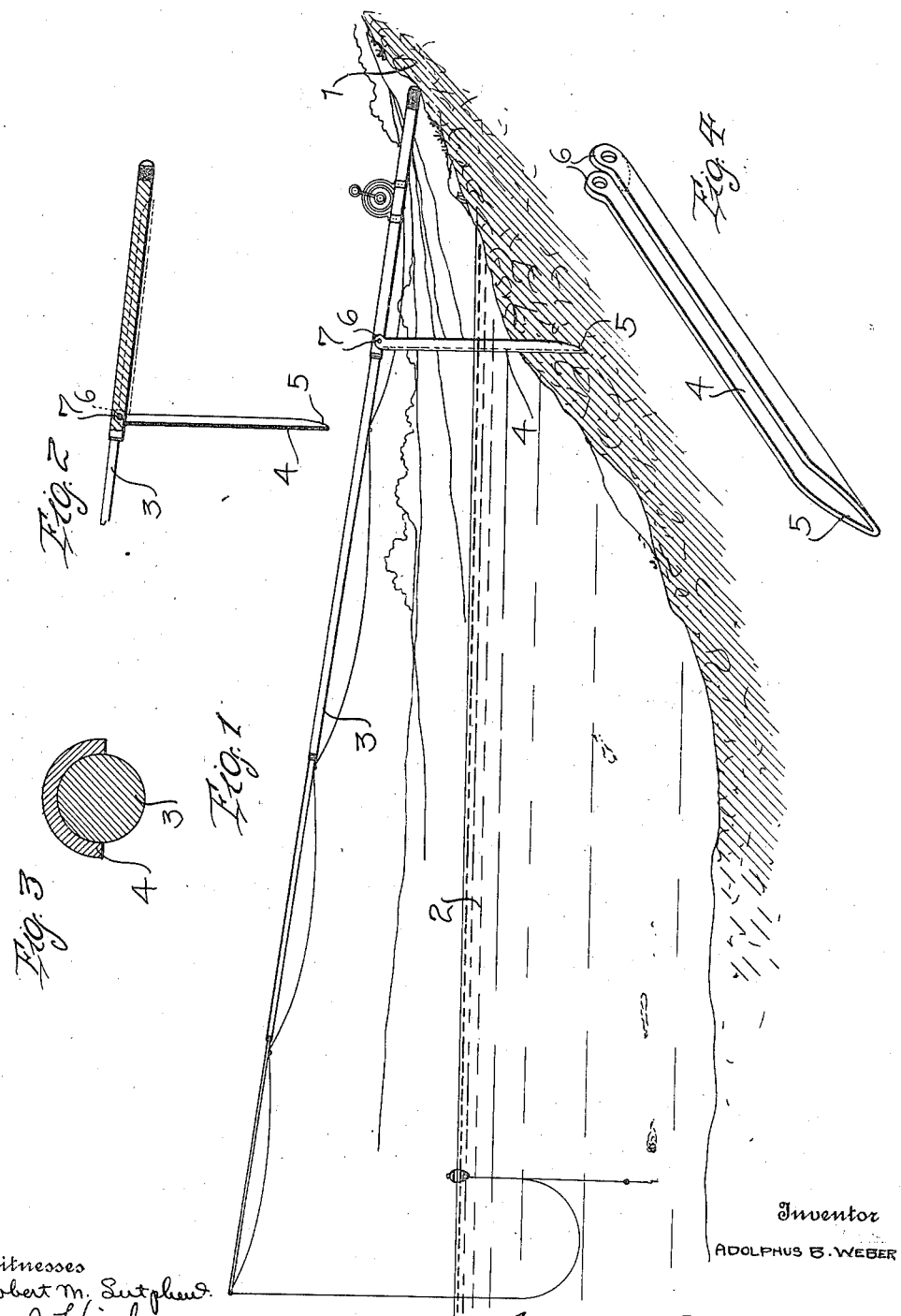

ADOLPHUS B. WEBER, OF KAUFMAN, ILLINOIS.

FISHING-POLE SUPPORT.

1,092,548.   Specification of Letters Patent.   Patented Apr. 7, 1914.

Application filed June 14, 1913. Serial No. 773,721.

*To all whom it may concern:*

Be it known that I, ADOLPHUS B. WEBER, a citizen of the United States, residing at Kaufman, in the county of Madison and State of Illinois, have invented certain new and useful Improvements in Fishing-Pole Supports, of which the following is a specification, reference being had to the accompanying drawings.

This invention relates to new and useful improvements in fishing pole supports and the primary object of the invention is to provide a device of this character which will readily support a fishing pole in position from the shore without attention by the fisherman.

A further object of the invention resides in providing a support which is pivotally carried on the pole adjacent its inner end and which is designed for disposal against said inner end of the pole to fit closely thereto and a still further object resides in providing a support which is designed arcuate in cross section to readily receive the aforesaid end of the pole therein when the support is folded against the pole proper.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a perspective view showing my device applied to use. Fig. 2 is a vertical section through the connection between the support and the pole. Fig. 3 is a horizontal section through the support, when folded against the pole; and Fig. 4 is a perspective view of the stake or supporting arm removed.

In describing my invention, I shall refer to the drawing in which similar reference characters designate corresponding parts throughout the several views and in which—

1 indicates the shore of a body of land, adjacent a body of water indicated as 2 and 3 indicates a fishing pole of the usual or any desired type. My invention primarily contemplates a means for supporting this pole on the shore, so that the same may be held in operative position without the attention of the fisherman and, to this end, I provide a support therefor which consists of a stake or arm 4, the same being formed of metal, designed arcuate in cross section. The lower end of this stake or arm 4 is tapered to a point, as shown at 5 and the upper end thereof is provided with a pair of spaced ears 6 which are designed to receive therebetween the pole 3, at a point adjacent its inner end. A bolt 7, extending through said ears 6 and through the pole 3, at the last mentioned point thereon, pivotally secures said stake or arm to the pole, and any preferred means may be engaged with the bolt for securing the same in position.

In practice, the pole with the support 4 thereon is brought to the water's edge and the pointed end of the stake or arm 4 engaged with the ground below the surface of the water. The inner end of the pole 3 which is preferably tapered to form a point is then engaged with the ground at a point slightly beyond the water's edge to support the pole 3 in any angular position desired, with respect to the water. The pole will then be supported in this position until such time as removed by the fisherman and it will be seen that after having once been properly disposed in the position shown in Fig. 1, further attention is unnecessary, until such time as it is desired to remove "the catch," from the hook.

By disengaging the inner end of the pole from the ground and drawing upwardly thereon, the complete device may be disengaged from its fastenings and the stake or arm 4 may be folded tightly against the inner end of said pole, it being appreciated that the arcuate design thereof will admit of the inner end of said pole readily fitting therein. The device may then be compactly folded and carried about from place to place. The addition of the support to the pole will not, therefore, add weight to the device, nor will the same afford any obstruction to the compact folding thereof.

From the foregoing description of the construction of my improved device, the manner of applying the same to use will be readily understood and it will be seen that I have provided a device which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

In a support for fishing poles, the combination with a pole; of a stake formed of metal and designed arcuate in cross section, the lower end of said stake being tapered to form a point, a pair of spaced ears formed on the upper end of said stake, and receiving the aforesaid pole therethrough, and means extending through said ears and through said pole to pivotally secure the latter to the stake, the arcuate design of said stake permitting a portion of the pole to be received therein when said stake is folded against said pole.

In testimony whereof I hereunto affix my signature in the presence of two witnesses.

ADOLPHUS B. WEBER.

Witnesses:
 MAX WEBER,
 R. O. LAUGHLIN.